Patented Oct. 21, 1924.

1,512,024

UNITED STATES PATENT OFFICE.

CARL D. HOCKER, OF EAST ORANGE, NEW JERSEY, ASSIGNOR TO WESTERN ELECTRIC COMPANY, INCORPORATED, OF NEW YORK, N. Y., A CORPORATION OF NEW YORK.

PLASTIC COMPOSITION.

No Drawing.   Application filed December 17, 1919.   Serial No. 345,460.

*To all whom it may concern:*

Be it known that I, CARL D. HOCKER, a citizen of the United States, residing at East Orange, in the county of Essex, State of New Jersey, have invented certain new and useful Improvements in Plastic Compositions, of which the following is a full, clear, concise, and exact description.

This invention relates to plastic compositions and more specifically, to molded insulating compositions which find extensive application in the electrical art.

One difficulty which has been experienced in making molded articles has been that due to the brittleness of the final product. Hard rubber, phenol condensation products, and ceramic compositions have been limited in their application on account of this characteristic.

One object of this invention is to produce a molding composition which will be capable of wider application than those heretofore employed in that it is much less brittle.

It has been found that a very satisfactory material for the purposes above mentioned may be produced by the heating of the homogeneous mixture of an organic acid or acid body such as oleaginous or resinous materials with a polyacid alcohol. In such processes a certain amount of distillation may take place. The acid and alcohol containing substances may be entirely separate and distinct compounds and be physically mixed together prior to the distillation, or they may be in chemical combination. In the latter case, as the well known action of vegetable oils when heated, the subsequent heat treatment is commonly spoken of as polymerization or gelatinization.

For example, the desired product may be obtained in any of the three following ways:

1. Treatment of a free fatty acid or a mixture of free fatty acids with a polyacid alcohol or a mixture of polyacid alcohols.

2. Treatment of a resin or varnish gum or mixture of resins or varnish gums with a polyacid alcohol or a mixture of polyacid alcohols.

3. Polymerization or gelatinization of a drying or semi-drying oil or a mixture of drying or semi-drying oils.

In the first of the above methods a physical mixture of acids which belong to the series of so-called fatty acids and of polyacid alcohols which are derivable from a paraffine hydrocarbon by the substitution of hydroxyl groups for atoms of hydrogen, is heated to gelatinization. In order that it may be understood what acids are intended to be included as belonging to the fatty acids class, a word of explanation is considered to be necessary. Various text-books which contain matter relating to the chemical composition of such substances, differ in their classification of the fatty acids. As used in this specification, the term "fatty acid" is considered to include any and all classes embraced by the following outline:

1. Acids of the acetic series, $C_nH_{2n}O_2$.
2. Acids of the oleic series, $C_nH_{2n-2}O_2$.
3. Acids of the series, $C_nH_{2n-4}O_2$ which includes the open chain and cyclic acids.
4. Acids of the linoleic series, $C_nH_{2n-6}O_2$.
5. Acids of the clupandonic and the $C_nH_{2n-8}O_2$ series.
6. Hydroxylated and carboxylated acids of any of the above classes.

In the second method, the acid containing bodies are resins or the so-called varnish gums. They consist of two or three separate and distinct chemical compounds, namely, the resin esters and their decomposition bodies, resins and resin acids. The adaptability of these compounds depends primarily on the presence of these resin acids. They are, for the most part of a complex constitution and of high molecular weight and contain one or more hydroxyl groups of carboxyl residues.

In the third method, only one substance is required to be used. It is in effect a chemical combination of compounds which belong to the general class referred to as being employed in the first method. Vegetable oils, chemically speaking, consist of mixtures of glycerides, that is a mixture of the esters of glycerine which are formed by the treatment of glycerine with the fatty acids. In this latter case both constituents go to effect the desired result, while in the case of the resin, the further addition of the alcohol is required.

The method of preparing this molding composition and its subsequent embodiment into a molded composition will be hereinafter described, its production from castor oil being referred to specifically.

A suitable amount of castor oil is subjected to destructive distillation until a gummy residue is obtained. The operation is preferably carried out in an iron receptacle so arranged that the fumes occasioned by heating may be readily removed. The heat should be applied indirectly so that there will be no danger of overheating part of the composition, which would result in a non-uniform mixture. The temperature of the mass should be allowed to rise gradually until about 300° C. degrees has been reached. This product is then placed in the desired mold and pressure applied. It has been found that in such a case when the pressure is released the mass will tend to spring back and occupy its original volume. If the composition is held within the mold and allowed to cool therein, under pressure, the difficulty experienced by the resiliency of the material may be partially overcome.

As a further modification of the process, however, it has been found more desirable to continue the heating of the gelatinous product which results from the gelatinization or polymerization until it is slightly carbonized. This is preferably accomplished by subjecting the composition to direct heat after having reduced it to comparatively small particles. A small amount of a free fatty acid, for example that derived from the saponification of tung oil, is then added in order to restore the binding properties lost by the charring. After thoroughly incorporating the acid, the mass is then put into the mold and pressed. In this manner the resilient effect is reduced to such an extent that a highly satisfactory molded article may be produced.

It has been found that the compositions may be used primarily as binders and comminuted inert material such as mica added thereto. If this material be used it is preferably mixed in just prior to the pressing process.

An examination of the compounds formed from any of the three methods referred to herein, will show that they are similar in many physical and chemical properties. The following will serve to show this more clearly;

1. Similar in appearance.
2. Physical phenomena accompanying formation of gelatinized products are similar.
3. Differ in degree of resiliency, but all are resilient and springy at some temperature.
4. Insoluble in the common solvents—even solvents or mixtures of them which will dissolve the oil or resin from which they are derived.
5. May soften upon heating, but will not melt to a liquid body when heated under any ordinary condition of pressure.

However, by selecting a particular oil or resin, the resulting product may be varied somewhat as far as its brittleness and resiliency is concerned. For example, the compound formed by using castor oil as a base is quite tenacious and flexible, while that formed from shellac as a base is more or less brittle at ordinary temperatures. It appears to be a characteristic of the compounds which are formed when vegetable oils are used as the basic material that they form more or less resilient and springy bodies at ordinary temperatures. On the other hand, the resin derivatives appear to be more brittle under the same conditions. When molded compositions are made from the oil base, for example, the pressure which is applied to the heated mold must be continued for quite a length of time, and subsequently cooled to insure a product that will retain its shape after release from the mold. The derivative of the resin base, however, will, upon the application of heat readily become homogenous and uniform, and require only a minimum amount of pressure with heat to give it a certain desired form which it will retain after removal from the mold. Hence, it is possible by taking a certain amount of the oil derived compound and adding thereto a certain amount of the resin derived compound, to obtain a final product which shall possess predetermined properties, in so far as resiliency and brittleness is concerned.

While it has been stated herein that partial carbonization of the gelatinous product resulting from the use of castor oil is desirable in order to secure a satisfactory composition, it is not necessarily desirable in all cases. For example, if the base selected be the copal, no charring is required in order to effect the desired result.

What is claimed is:

1. A molding composition comprising a filler and the product obtained by heating until partial carbonization has taken place a material capable of engendering organic acid and glycerine.

2. A molding composition comprising a filler, the product obtained by heating until partial carbonization has taken place a material capable of engendering organic acid and polyacid alcohol, and a substance to restore the binding properties lost by the charring of said compounds.

3. A molding composition comprising a filler, the product obtained by heating vegetable oil until partial carbonization has taken place, and a substance to restore the binding properties lost by the charring of said oil.

4. The process of making a molded article which comprises gelatinizing vegetable oil, reducing the resiliency of the gelatinous product, adding thereto a filler, and pressing the whole into the desired shape.

5. The process of making a molded article which comprises mixing the gelatinous product derived from heating vegetable oil and that derived from heating a resin adding thereto a filler, and pressing the whole into the desired shape.

6. The process of making a molded article which comprises heating vegetable oil until partial carbonization takes place, adding a substance to restore the binding properties lost by the oil through charring, mixing therewith a filler, and pressing the product into the desired shape.

7. A molding composition comprising a filler, the product obtained by heating castor oil until partial carbonization has taken place, and a small amount of free fatty acid to restore binding properties lost by the charring of said oil.

8. The process of making a molded article which comprises the destructive distillation of vegetable oil until a gummy residue is obtained, the application of pressure to the hot mass and the cooling of the mass while under pressure.

9. The process of making a molded article which comprises heating a material capable of engendering organic acid and polyacid alcohol, reducing the resiliency of the gelatinous product, adding thereto a filler, and pressing the whole into the desired shape.

10. The process of making a molded article which comprises gelatinizing a material capable of engendering fatty acid and glycerine, reducing the resiliency of the gelatinous product, adding thereto a filler, and pressing the whole into the desired shape.

11. The process of making a molded article which comprises heating a material capable of engendering organic acid and glycerine until partial carbonization has taken place, adding thereto a filler, and pressing the whole into the desired shape.

In witness whereof, I hereunto subscribe my name this 10th day of December, A. D. 1919.

CARL D. HOCKER.